United States Patent [19]

Covell, III

[11] Patent Number: 4,996,741
[45] Date of Patent: Mar. 5, 1991

[54] POULTRY WASHING AND SCALDING SYSTEM AND PROCESS

[76] Inventor: Edward H. Covell, III, U.S. 13, Hickmann Village, Laurel, Del. 19956

[21] Appl. No.: 558,466

[22] Filed: Jul. 27, 1990

[51] Int. Cl.$^5$ .............................................. A22C 21/04
[52] U.S. Cl. ...................................... 452/74; 452/131
[58] Field of Search ................. 17/11.2, 51, 1 E, 44.1, 17/47

[56] References Cited

U.S. PATENT DOCUMENTS

| | | | |
|---|---|---|---|
| 2,649,615 | 8/1953 | Sharp | 17/11.2 |
| 2,732,583 | 1/1958 | Van Dolah | 17/11.2 |
| 2,810,927 | 10/1957 | Adams et al. | 17/11.2 |
| 2,820,245 | 1/1958 | Turner | 17/11.2 |
| 2,879,540 | 3/1959 | Van Ness | 17/11.2 |
| 4,947,518 | 8/1990 | Cover, III | 17/11.2 |

Primary Examiner—Willis Little
Attorney, Agent, or Firm—Watson, Cole, Grindle & Watson

[57] ABSTRACT

A poultry washing and scalding process and system provides for a bird washing section at the bird exit and of the immersion section of the scalder. The birds are spray washed before exiting the system such that when arriving at the picking station, they are substantially bacteria free. Particles cleaned from the birds at the washing section are removed and pass directly into the liquid recirculating system without flowing into the immersion section of the scalder thereby avoiding any increase in bacteria therein. The birds are washed with water that has been recycled and mixed with add water, and the immersion section may be replenished with the same water.

12 Claims, 1 Drawing Sheet

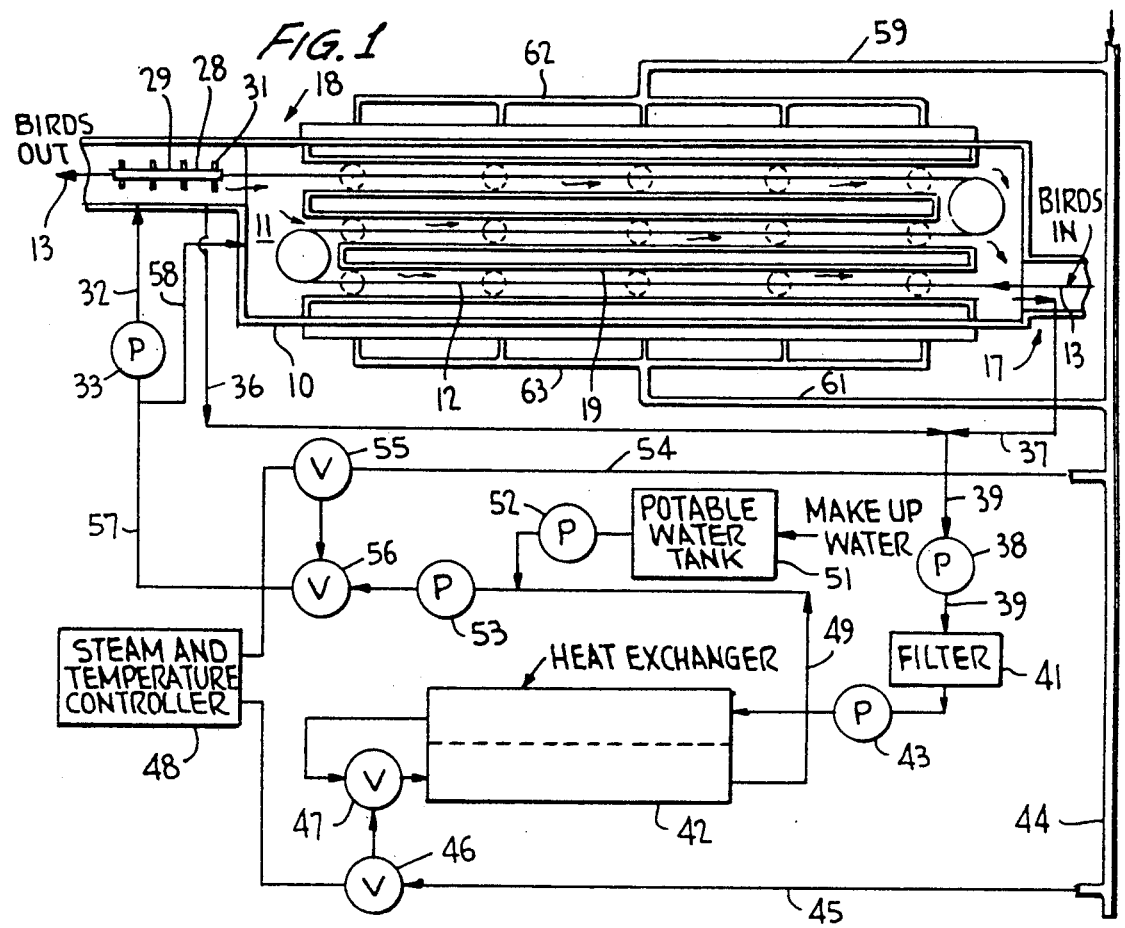
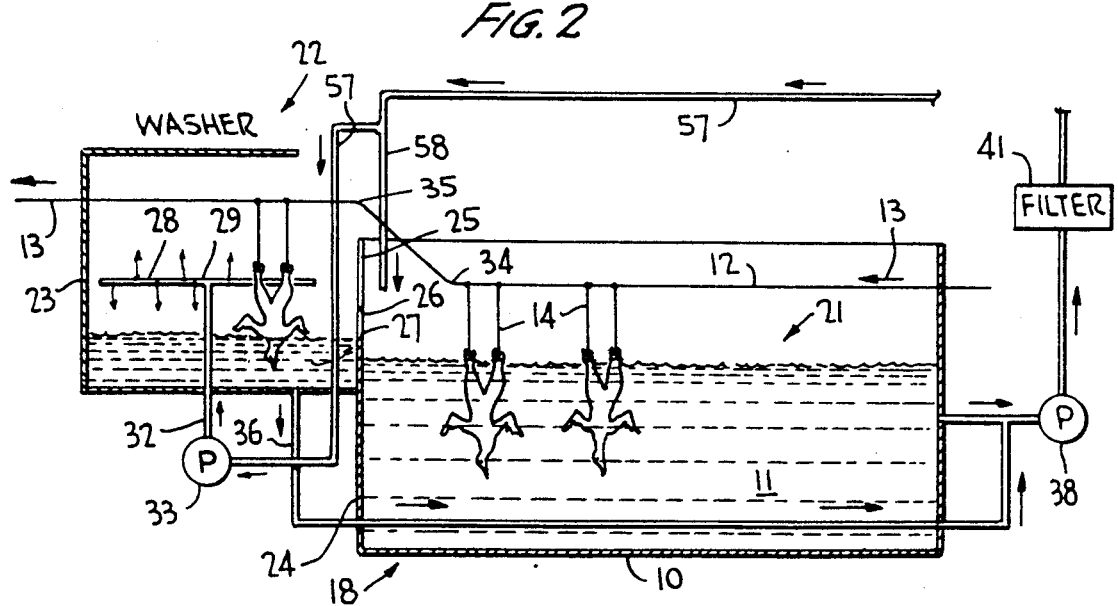

POULTRY WASHING AND SCALDING SYSTEM AND PROCESS

RELATED PATENTS

This application relates to my U.S. Pat. No. 4,852,215, dated Aug. 1, 1989, to my U.S. Pat. No. 4,947,518, dated Aug. 14, 1990, and to my U.S. Pat. No. 4,944,068, dated July 31, 1990, the entirety of the disclosures of which being specifically incorporated herein by reference.

BACKGROUND OF THE INVENTION

This invention relates to a poultry washing and scalding system and process in which poultry is conveyed through a scalder and thereafter through a washer for substantially removing contaminated particles from the poultry. Contaminated liquid is removed from the washer, bypasses the scalder to avoid scalder contamination, and is sanitized and recirculated.

As known, a scalder is utilized as part of a poultry processing operation so as to heat the skin of the bird to loosen the feathers allowing the feathers to be plucked at a station after the birds leave the scald tank. The bird's feathers act as insulation preventing heat from reaching the skin.

In immersion scalding the birds are carried by an overhead conveyor hanging by the feet and are immersed in a hot bath of water. The water is heated and agitated by air injection in the bottom of the scalder or by pumps moving large volumns of water that flow over the birds. During the scalding process the skin and feathers are heated by the heat transfer of hot water (124° to 142° F.) into the bird.

The aforementioned patents disclose immersion scalders which substantially avoid cross-contamination of the birds, and in which the scald water is cleaner as it is filtered and sanitized during recirculation. By screening and filtering the recirculated water a substantial amount of coarse materials such as sand and wood chips are removed from the water. With these particles removed from the water recontamination caused by unfiltered water passing through the bird feathers, is substantially avoided. Therefore, by sanitizing the water surface bacteria on the skin will be lower and there will be less of such bacteria for the picking machines to beat into the bird after leaving the scalding operation.

Despite the successes achieved through my patented systems and processes, it is desirable to even more throughly clean and sanitize the birds before entering the feather picking station. Should any surface bacteria remain on the skin of the birds after leaving the scalder, the surface bacteria tends to enter the birds through the skin holes created after the feathers are plucked by the pickers.

SUMMARY OF THE INVENTION

It is therefore an object of the present invention to provide a poultry immersion scalder having a washer or washing section at the bird exit end of the scalder for spray washing the birds with water that has been recirculated essentially according to the system and process of my prior patents. According to the invention, the tank has an open immersion section for containing scald liquid, and has a washing section, or a wash receptacle, including liquid sprayers located at a poultry exit station of the tank for removing any contaminated particles from the poultry. The poultry is conveyed in one direction through the tank from an entrance station through the exit station while the poultry is immersed in the liquid at the immersing station, and further while the poultry is sprayed by the sprayers at the washing station, as the poultry hangs by the legs from the conveyor. The liquid is recirculated by returning it at least to the washing section through the sprayers and by removing liquid containing the contaminated particles from the washing section. The removed liquid is filtered and sanitized before being returned. And, as of the recirculation system, the liquid may be returned to the immersing section and may be removed from that section.

As in my prior U.S. Pat. No. 4,947,518, the water removed is sanitized as it passes in heat exchange relationship with superheated water/steam. The heating liquid from the heat exchanger is then combined with fresh make-up water for yielding sanitized recirculating water at a predetermined scald temperature before it is returned at the exit station of the scalder.

The poultry conveyor may be designed to lift the immersed birds at least partially out of the scalding liquid prior to reaching the washing section so at to subject the birds to the spray wash at that section during the continued conveyance of the birds.

The washing section comprises a discrete area from that of the immersing section, although the two sections are connected to permit over flow of surface water from the washing to the immersing section. And, the heavy contaminated particles washed from the bird feathers at the washing station will sink to the bottom and will be removed as part of the recirculating system which includes filtering, heating and sanitizing means. These contaminated particles therefore bypass the immersing section of the tank, thereby avoiding scalder contamination during the immersing process.

Other objects, advantages and novel features of the invention will become more apparent from the following detailed description of the invention when taken in conjunction with the accompanying drawings.

BRIEF DESCRIPTION OF THE DRAWINGS

FIG. 1 is a schematic view of the poultry scalding and washing system to the invention: and FIG. 2 is a side view of a scalder tank which includes a washing section and showing the conveyor arrangement for conveying the birds through the immersing and washing sections.

DETAILED DESCRIPTION OF THE INVENTION

Turning now to the drawings wherein like reference characters refer to like and corresponding parts throughout the several views, an immersion tank 10 is shown in FIG. 1 for containing scald liquid 11 at a predetermined scald temperature. A conveyor 12 which may have several runs back-and-forth is positioned above the tank for moving poultry in one direction through the tank shown by arrows 13 in FIGS. 1 and 2. The conveyor is of known construction having movable shanks 14 suspended therefrom to which the legs of the birds are secured in some manner such that the birds are fully immersed in liquid 11 when dipping downwardly into the liquid from the BIRDS IN location through the conveyor pass until the birds are lifted at least partially out of the scald liquid and into the washing section, as will be more fully described hereinafter. The conveyor moves the birds from an entrance station 17 at the tank to an exit station 18 in the direction of arrows 13.

As described in U.S. Pat. No. 4,852,215, the scalder tank may have a relatively shallow head trough at entrance station 17, the trough containing fresh water slightly heated above ground water temperature and supplied in the manner described in the patent.

The conveyor has an elevated section for suspending the birds such that the heads only of the birds are immersed in the fresh head trough water. Thus, if the bird is still breathing at this stage of the poultry processing operation it will inhale relatively clean water into its lungs and air sacs. The birds will thereafter draw in water having a much lower bacteria count than when immersed in prior systems.

The scalder tank is constructed to direct the flow of water downwardly onto the birds being conveyed through the tank as in a manner shown in U.S. Pat. No. 4,947,518 illustrating two different types of immersion scalders. Most scalders have agitators with props at the tank bottom to move the water. Some scalders also utilize pumps to move air into the bottom of the scalder to submerge the bird. A 3-pass conveyor or a 4-pass conveyor, or a conveyor having more or less conveyor passes may be provided when desired. And, although entrance and exit stations 17 and 18 are shown in FIG. 1 located at opposite ends of the tank, it should be pointed out that the entrance and exit stations may be located at the same end of the tank, without departing from the invention. Moreover, as is well known, the conveyor passes are separated by partition walls 19 which allow water from different conveyor passes to be intermixed.

Scalder tank 10 has an immersion section 21 at which the birds are immersed in the scald liquid 11 while being conveyed during back-and-forth movement by the conveyor in the direction of arrows 13 from the bird entrance station 17 to the bird exit station 18. At the bird exit station 18 is a washing section 22 which may be in the form of a liquid receptacle 23 mounted in some normal manner on end wall 24 of tank 10. The confronting end wall 25 of receptacle 23 has a transverse opening 26 establishing communication with the scalder tank and defining a weir wall 27. Surface liquid from receptacle 23 overflows the weir wall, as shown by the arrow in FIG. 2, into the immersing section 21 of the tank, as will be described more fully hereinafter. Otherwise, receptable 23 can be spaced from end wall 24 of the tank and joined thereto by one or more conduits through which surface water from the receptacle flows into the immersion section.

The washing section essentially forms an intergral part of the tank together with its immersion section, the washing section forming the improvement according to the invention.

Receptacle 23 contains a spray wash header or manifold 28 mounted within the receptacle in any normal manner. The header may comprise a central pipe 29, and transverse pipe arms 31, the central and transverse arms having a plurality of spray openings through which the scald liquid is sprayed onto the birds conveyed through receptacle 23. The header is connected to a water delivery conduit 32 to which liquid is pumped via pump 33.

Conveyor 12 is arranged as having bends 34 and 35 located at exit station 18 for lifting the birds out of the immersion section 21 as the birds are conveyed through washing section 22. In the washing section, the birds are no longer immersed in the scald water but are subjected to the spray washing action through header 28 after the birds leave the immersion section. In such manner, particles remaining on the bird features after leaving the immersion section, such as sand, grit, fesces, etc., are substantially removed at the washing section and are collected as these particles fall to the bottom of receptacle 23.

The liquid recirculating system is essentially the same as that set forth in my prior U.S. Pat. No. 4,947,518 except that it is tailored to remove the contaminated liquid from receptacle 23 and to return recycled liquid at scald temperature (+ or −4° F. to the spray wash header.

The bacteria contaminated water is removed from receptacle 23 via conduit 36, and bacteria contaminated water may be removed via conduit 37 at entrance station 17 of the scalder at the location at which the birds enter the scalder during operation of the conveyor. Removal may be effected via pump 38 or by gravity, and will flow via conduit 39 through a screening and filtering station 41 at which wood chips, sand and other particles removed from the birds at both the immersion and washing sections will be filtered and screened from the removed scalded water. The filtering will help maintain the heat exchangers used in the present system clean and operating at the highest efficiency. And, by filtering these particles from the removed scald water it will be assured that a reduced amount of such particles will cling to the birds before exiting the system.

It has been found that, while particles clinging to the bird feathers are removed during the immersion scalding process, many of such particles may remain clinging to the bird feathers after leaving the immersion section. The natural bird oils oftentimes create a sticky substance which causes these particles to remain adhered to the bird and its feathers even after making several passes through the immersion section. It has been found that spray washing according to the invention removes much of the bacteria-laden particles adhering to the bird feathers before the birds reach the picking station. By removing these particles from recepticle 23 via a separate conduit 36, the immersion section of the scalder is bypassed thereby effecting improved contamination control. Many of the heavy contaminated particles removed at the washing section will sink to the bottom of receptacle 23 and will be removed via conduit 36. If such particles were otherwise allowed to collect in the immersion section of the tank, they would be disbursed in the scald water thereby increasing the bacteria load in the scalder. The removed particles from the washing section are fed directly to filter 41 keeping the immersion section of the scalder as clean as possible.

Thus, when the scalded and washed birds leave the present system, any likelihood of the pickers beating foreign material into the skin of the birds during the subsequent poultry processing operation, is minimized. Such would normally occur through the skin holes remaining after the feathers are plucked. The cleansing of the birds according to the invention after leaving the imersion scalding process substantially reduces the bacteria on the bird when arriving at the picking station.

The filtered liquid through conduit 39 flows through a heat exchanger 42 via a pump 43. The heat exchanger is fed with, for example, super heated water (at about 175° F.) heated via a steam conduit 44 having a branch line 45 connected to the heat exchanger through steam valve 46 and a steam/water valve 47. A suitable temperature controller 48 may be set for operating valve 47 to maintain the temperature of the super-heated water to a desired level.

The filtered liquid from conduit 39 is typically at the same scald temperature of approximately 128° F. as that in the immersion and washing sections. This filtered liquid flows through heat exchanger 42 and into heat exchange relationship with super heated water. This heat exchanger is constructed in any normal manner having a plurality of heat exchange plates effecting heat exchange between the oppositely directed flow of liquid and steam therein, such that the filtered liquid increases in temperature as the superheated water decreases in temperature during this heat exchange, and the heating liquid at the exit end of heat exchanger flows into conduit 49 at a predetermined temperature of about 133° F., for example, which can be maintained by the heat exchanger and controller 48.

The injected steam functions to kill the bacteria in the filtered water as BTU's are added. The superheated recirculated water will then exit through heat exchanger 42 passing off heat to the incoming filtered water such that this completes the loop of the bacteria killing segment.

Potable ground water used as make-up water for the system, typically at a temperature of about 65° F., is supplied from a source (not shown) to a potable water holding tank 51 and is pumped via a pump 52 into conduit 49. A recirculation pump 53 feeds the mixture of heating liquid and potable liquid into conduit 49 through the system. The temperature of the mixed liquid is maintained at the desired level via steam injection, or the like, as through a branch conduit 54 passing through a suitable valve 55 to a steam-to-water mixing valve 56. The temperature is maintained at the desired level by controller 48 which may regulate valve 56. The mixture of heating liquid and potable water in conduit 49 is heated to the scald temperture, which may be 128° F., so that the liquid in conduit 57 is returned via pump 33 to liquid receptacle 23 at washing section 22 through conduit 32 and into the spray header. The liquid may also be returned via a branch conduit 58 to the immersion section of the tank at bird exit station 18. Thus, scald liquid is recirculated at the scald temperature through the immersion section of the tank in a direction, at least at the exit station, opposite the direction of travel of the birds. The sanitized recirculating liquid being returned to the washing section and to the immersion section respectively through conduit 32 and 58 is substantially free of bacteria and includes make-up water which is heated partially by the heating liquid flowing through conduit 49 and supplemented by steam injection via branch conduit 54, so that cleaner water is recirculated through the tank sections at a rate which may, for example, be about equal to the liquid volume of the tank liquid in 30 minutes.

The washing system of the invention has been described with reference to the immersion section of the tank which operates under a counterflow principle, i.e., the recirculating liquid being returned to the immersion section at the exit station in a direction opposite the bird direction of travel along arrow 13. However, the present washing section could otherwise be provided for a standard immersion scalder not relying on such counterflow principle, without departing from the invention. Thus, the sanitized recirculating scald liquid could be returned to the immersion section at locations other than exit station 18. And, all of the recycled water could be returned directly to the washer in which case a greater amount of liquid will flow over weir wall 27 from receptable 23 into the scalder tank.

And, the washer according to the invention supplements the scalding process as heat is added to the birds as well as having a washing effect.

As shown in FIG. 1, live steam may also be injected into the immersion section via branch conduits 59 and 61 and via manifold branches 62 and 63 to assure maintenance of liquid 11 in the immersion section at the desired scald temperature. Temperature control units (not shown) may be provided for sensing and regulating the temperature of liquid 11 in combination with suitable valving.

The energy requirements to heat the make-up water and the BTU's provided to the aforedescribed system by the superheat operation for the immersion scalding system, is described in detail in my prior U.S. Pat. No. 4,947,518, the disclosure which is hereby incorporated.

From the foregoing description, it can be seen that as the birds exit the immersion scalding section they are lifted out of the scald water and are washed with water that has been sanitized, recycled and mixed with make-up water. This washing water is sprayed onto the birds and then falls to the bottom of the receptable 23. Part of this water flows back into the immersion section and some of this water is removed from the bottom of the washer receptable to the pump removing the water from the immersion section. The purpose of by-passing the scalder with this water is contamination control. Heavy contaminated particles will sink to the bottom of the washer receptable and flow out of the bottom. If these particles were allowed to flow into the immersion section they would be dispersed in the scald water increasing the bacteria load in the scalder. The particles removed from the bird feathers at the washing section go directly to the filter 41 keeping the immersion section of the scalder as clean as possible.

The washer receptacle 23 may be a closed receptacle for increasing heat supplied to the birds at the washing section. The heat at the section may be otherwise controlled.

Obviously, may the other modifications and variations of the present invention are made possible in the light of the above teachings. It is therefore to be understood that within the scope of the appended claims the invention may be practiced otherwise than as specifically described.

What is claimed is:

1. A poultry washing and scalding system comprising, a tank having an open immersion section adapted to contain scald liquid at a predetermined scald temperature for poultry, said tank having a washing section including liquid spray means at a poultry exit station of said tank for removing any contaminated particles from the poultry, conveyor means for moving the poultry in one direction through said tank from an entrance station through said exit station while the poultry is immersed in the liquid at said immersion section and while the poultry is sprayed by said spray means at said washing section as the poultry hangs by the legs from said conveyor means, and liquid recirculating means connected to said tank for returning the liquid at least to said washing section through said spray means and for removing liquid containing the contaminated particles from said washing section, said recirculating means including means for filtering the liquid removed.

2. The system according to claim 1, further comprising means for replenishing any loss of liquid from said tank, and means for heating replenished liquid to said scald temperature before being returned to said washing section.

3. The system according to claim 1, wherein said recirculating means include means for removing the liquid from said immersion section.

4. The system according to claim 1, wherein said recirculating means include means for returning the liquid to said immersion section at said exit station.

5. The system according to claim 1, wherein said recirculating means include means for returning the liquid to said immersion section at said exit station and for removing the liquid from said immersion section at a location other than said exit station to thereby recirculate the liquid at least at said exit station in a direction opposite said one direction.

6. The system according to claim 1, wherein said washing section comprises a receptacle having a side including an overflow passage through which the liquid flows from said receptable into said immersion section.

7. The system according to claim 6, wherein said passage comprises a weir wall.

8. A poultry washing and scalding process, comprising the steps of immersing poultry in a tank having an open immersion section adapted to contain scald liquid at a predetermined scald temperature, spray washing the poultry after the immersing step at a washing section having spray means for removing any contaminated particles from the poultry, said washing section being located at a poultry exit station of said tank, the immersing and washing steps being carried out by conveying the poultry in one direction through said tank from an entrance station and through said washing section while the poultry hangs by the legs, recirculating the liquid by returning the liquid at least to said washing section through said spray means and by removing liquid containing the contaminated particles from said washing section, and filtering the removed liquid before returning the liquid.

9. The process according to claim 8, further comprising replenishing any loss of liquid from said tank, and heating the replenished liquid to the scald temperature (+ or −4° F.) returning the liquid.

10. The process according to claim 8, wherein said recirculating step includes removing the liquid from said immersion section.

11. The process according to claim 8, wherein said recirculating step includes returning the liquid to said immersion section at said exit station.

12. The process according to claim 11, wherein said recirculating step further includes removing the liquid from said immersion section at a location other than said exit station for recirculating the liquid at least at said exit station in a direction opposite said one direction.

* * * * *